(12) United States Patent
Nakashima

(10) Patent No.: US 10,011,035 B2
(45) Date of Patent: Jul. 3, 2018

(54) MACHINING DEVICE AND ELECTRIC MOTOR FOR THE SAME

(71) Applicant: MAKITA CORPORATION, Anjo-shi, Aichi (JP)

(72) Inventor: Tatsuo Nakashima, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 181 days.

(21) Appl. No.: 15/015,186

(22) Filed: Feb. 4, 2016

(65) Prior Publication Data

US 2016/0248295 A1    Aug. 25, 2016

(30) Foreign Application Priority Data

Feb. 23, 2015  (JP) ................................. 2015-032637
Nov. 27, 2015  (JP) ................................. 2015-231406

(51) Int. Cl.
| | |
|---|---|
| *B27B 9/00* | (2006.01) |
| *H02K 5/16* | (2006.01) |
| *B27B 5/29* | (2006.01) |
| *H02K 7/116* | (2006.01) |
| *H02K 7/14* | (2006.01) |
| *H02K 9/06* | (2006.01) |

(52) U.S. Cl.
CPC ................. *B27B 9/00* (2013.01); *B27B 5/29* (2013.01); *H02K 5/161* (2013.01); *H02K 7/116* (2013.01); *H02K 7/14* (2013.01); *H02K 9/06* (2013.01)

(58) Field of Classification Search
CPC . B27B 5/29; B27B 9/00; H02K 5/161; H02K 7/116; H02K 7/14; H02K 9/06

USPC ................ 30/166.3, 369–377, 388–391, 276
See application file for complete search history.

(56) References Cited

U.S. PATENT DOCUMENTS

| | | | | | |
|---|---|---|---|---|---|
| 4,543,718 | A | * | 10/1985 | Duescher ................ | A61F 15/02 30/166.3 |
| 4,590,675 | A | * | 5/1986 | Louw ...................... | B26B 19/44 30/133 |
| 4,594,778 | A | * | 6/1986 | Dona ...................... | B26B 19/12 30/43.6 |
| 4,680,862 | A | * | 7/1987 | Wieland ................. | B27B 17/08 30/381 |
| 5,623,764 | A | * | 4/1997 | Cseh ....................... | B26B 19/20 30/133 |
| 6,584,695 | B1 | * | 7/2003 | Chang .................. | B23D 59/003 30/391 |
| 6,655,033 | B2 | * | 12/2003 | Herrmann ................ | B25F 5/00 30/276 |

(Continued)

FOREIGN PATENT DOCUMENTS

JP        2012-176468 A       9/2012

*Primary Examiner* — Jason Daniel Prone
(74) *Attorney, Agent, or Firm* — Oliff PLC

(57) ABSTRACT

A machining device includes a rotary cutting tool, and an electric motor as a drive source for rotating the rotary cutting tool. A motor housing of the electric motor is connected to a stationary cover covering the rotary cutting tool. The electric motor is an outer rotor type electric motor includes a stator situated inside of a rotor. A rotor is supported by a motor shaft at a position of output side in the motor axis direction with respect to the stator. The rotor is mounted to the rotor base and is rotatably supported on the stationary cover. The stator is fixed to the motor housing so as to be immovable in the motor axis direction, and is arranged inside of the rotor.

3 Claims, 8 Drawing Sheets

(56) References Cited

U.S. PATENT DOCUMENTS

| | | | | |
|---|---|---|---|---|
| 6,933,630 B2* | 8/2005 | Kraus | ............... | B26B 19/28 30/43.7 |
| 7,207,114 B2* | 4/2007 | Rosu | ............... | B26B 25/002 30/276 |
| 7,646,118 B2* | 1/2010 | Yoshida | ............... | H02K 9/22 30/276 |
| 8,033,022 B2* | 10/2011 | Ben-Ari | ............... | B26B 21/34 30/42 |
| 8,037,614 B2* | 10/2011 | Yang | ............... | B23D 59/006 30/388 |
| 8,136,559 B2* | 3/2012 | Rosenau | ............... | B27C 1/10 30/475 |
| 8,505,207 B2* | 8/2013 | Thien | ............... | B26B 25/002 30/276 |
| 8,601,696 B2* | 12/2013 | Ben-Ari | ............... | B26B 19/18 30/42 |
| 8,782,906 B2* | 7/2014 | Moreno | ............... | B23D 59/006 30/390 |
| 8,857,067 B2* | 10/2014 | Moreno | ............... | B23D 47/12 30/388 |
| 8,904,651 B2* | 12/2014 | Heinzelmann | ............... | B27B 17/12 30/381 |
| 9,687,995 B2* | 6/2017 | Simm | ............... | B27C 1/10 30/475 |
| 2002/0166240 A1* | 11/2002 | Duford | ............... | B23D 47/12 30/388 |
| 2003/0177642 A1* | 9/2003 | Bax | ............... | B26B 19/14 30/43.6 |
| 2004/0060178 A1* | 4/2004 | Willer | ............... | B27B 9/00 30/391 |
| 2004/0194600 A1* | 10/2004 | Wu | ............... | B23D 59/003 30/392 |
| 2010/0269353 A1* | 10/2010 | Martin | ............... | B23D 59/006 30/374 |
| 2012/0110856 A1* | 5/2012 | Kressmann | ............... | B26B 19/28 30/45 |
| 2013/0000132 A1* | 1/2013 | Bergquist | ............... | B27B 17/08 30/381 |
| 2013/0097878 A1* | 4/2013 | Naito | ............... | B23D 47/12 30/374 |
| 2013/0333228 A1* | 12/2013 | Ota | ............... | B23D 47/12 30/273 |
| 2014/0259692 A1* | 9/2014 | Racov | ............... | A01D 34/90 30/277.4 |
| 2014/0366383 A1* | 12/2014 | Dyer | ............... | B23Q 11/127 30/123 |
| 2015/0020391 A1* | 1/2015 | Abe | ............... | B23D 47/12 30/388 |
| 2015/0266201 A1* | 9/2015 | Nakashima | ............... | B23Q 9/00 30/374 |
| 2015/0303765 A1* | 10/2015 | Akiyoshi | ............... | H02K 5/20 310/59 |
| 2016/0088792 A1* | 3/2016 | Yamaoka | ............... | A01D 34/81 30/276 |
| 2016/0105066 A1* | 4/2016 | Horng | ............... | H02K 5/08 310/89 |
| 2016/0121509 A1* | 5/2016 | Kuragano | ............... | B27B 9/00 30/388 |
| 2016/0143219 A1* | 5/2016 | Yuan | ............... | A01D 34/90 30/276 |
| 2016/0193673 A1* | 7/2016 | Yoshida | ............... | B23D 47/12 30/388 |
| 2016/0197525 A1* | 7/2016 | Cho | ............... | H02K 1/146 310/60 R |

* cited by examiner

MACHINING DEVICE AND ELECTRIC MOTOR FOR THE SAME

CROSS-REFERENCE TO RELATED APPLICATIONS

This application claims priority to Japanese patent applications serial number 2015-032637 field Feb. 23, 2015 and serial number 2015-231406 field Nov. 27, 2015, the contents of which are incorporated herein by reference in their entirety for all purposes.

BACKGROUND

The present invention relates to a machining device such as a portable circular saw, a desktop circular saw, or a grooving cutter, and to an electric motor that can be suitably used in this machining device.

The electric motor constituting a drive source of a machining device of this type is, for example, an inner rotor type electric motor in which a rotor is arranged on the inner peripheral side of a stator, or an outer rotor type electric motor in which a rotor is arranged on the outer peripheral side of a stator. As compared with the inner rotor type electric motor, the outer rotor type electric motor exhibits a rotor of a larger surface area, so that it is possible to set the magnetic force large, whereby it can output high torque. Thus, if the output torque set is the same, the outer rotor type motor can be smaller in size as compared with the inner rotor type motor. If the two types of motor are set to an equal size, the outer rotor type motor can output higher torque as compared with the inner rotor type motor.

Japanese Laid-Open Patent Publication No. 2012-176468 discloses a machining device using an outer rotor type electric motor as a drive source. The outer rotor type electric motor includes a stator and a motor shaft passing through the stator. The stator has one end situated on an output side in a motor axis direction and the one end is fixed to a case via a stator base. A rotor and a cooling fan are supported on an end of the motor shaft near the other end of the stator. A driving gear of a reduction gear train is attached to the other end of the motor shaft and situated on the output side. A rotational power of the electric motor is transmitted to a spindle through mesh-engagement between the driving gear and a driven gear, whereby a rotary cutting tool rotates. A motor housing accommodating the electric motor is connected to a gear housing accommodating the reduction gear train. The gear housing is provided integrally on the back of a blade case.

There has been a need for an improvement of the outer rotor type electric motor mainly in terms of dismantling property and assembling property. The stator is attached to the stator base at a position nearer to the blade than the rotor. The stator base and the motor housing are connected to the gear housing together by a screw. That is, the stator base is not directly fixed to the gear housing. Thus, when the motor housing is removed at the time of the dismantling of the electric motor, the stator base is also removed. And, the stator is separated from the motor housing and the stator base, and the stator is attracted to a magnet of the rotor to be integrated therewith. The magnetic force of the magnet of the rotor is large, so that in the state in which the stator not connected to the motor housing and the rotor are attracted to each other as stand-alone units, the operation of separating the two from each other against the magnetic force is very difficult to perform.

Thus, there has been a need for an outer rotor type electric motor of high dismantling property and high maintenance property, which is realized, for example, by enabling the stator and the rotor to be easily separated from each other at the time of dismantling of the electric motor.

SUMMARY

According to an embodiment of the present invention, a machining device includes a rotary cutting tool, and an electric motor as a drive source for rotating the cutting tool. A motor housing of the electric motor is connected to a stationary cover covering the rotary cutting tool. The electric motor is an outer rotor type electric motor includes a stator situated inside of a rotor. A rotor is supported by a motor shaft at a position of output side in the motor axis direction with respect to the stator. The rotor is mounted to the rotor base and is ratatably supported on the stationary cover. The stator is fixed to the motor housing so as to be immovable in the motor axis direction, and is arranged inside of the rotor.

Thus, the stator is fixed on the motor housing, whereas the rotor is supported by the motor shaft at a position of the output side of the stator. Thus, when separating the motor housing from the stationary cover, the rotor is left behind with the stationary cover via the motor shaft. On the other hand, the stator is removed integrally with the motor housing, and is separated from the rotor. In this way, when dismantling the electric motor, the stator may be simultaneously separated from the rotor at the stage where the motor housing is separated from the stationary cover. As a result, it is possible to improve the electric motor in terms of dismantling property and, by extension, to enhance the maintenance property of the electric motor.

Further, the stator and the rotor may be separated from the stationary cover integrally with the motor housing while the stator and the rotor are attracted to each other by the magnetic force of a magnet. Even in this case, the stator is fixed to the motor housing so as to be immovable in the motor axis direction. Thus, the stator may be easily separated from the rotor against the magnetic force because the force for separating may be applied by grasping the motor housing that is larger than the stator. After this, the rotor may be detached singly and easily from the stationary cover. A larger force may be applied by grasping the motor housing that is larger than the stator. As a result, it is possible to easily separate the stator from the rotor against the magnetic force.

In contrast, in the conventional construction, the stator is not fixed to the motor housing in the motor axis direction. The motor housing is separated from the stationary cover while leaving the stator and the rotor on the stationary cover. As a result, the stator and the rotor are detached from the stationary cover side while attracted to each other as stand-alone units. In this case, it is very difficult to separate the extracted rotor and stator from each other against the magnetic force. The stator and rotor as stand-alone units are objects smaller than the motor housing and the stationary cover, so that it is necessary to apply a very large force to separate the stator and rotor as stand-alone units from each other while directly grasping them. Thus, the separating operation is very difficult to perform.

According to the embodiment, the stator may be separated from the stationary cover integrally with the motor housing. Thus, even if the rotor and the stator are separated together from the stationary cover, the stator may be easily separated from the rotor afterwards while grasping the motor housing.

Thus, it is possible to achieve an enhancement in the workability (dismantling property) at the time of the dismantling of the electric motor (separation of the stator and rotor) and, by extension, an improvement in terms of maintenance property.

According to another embodiment, the machining device may include a stator support portion protruding in the motor axis direction in the motor housing. The stator may be fixed to the stator support portion near the distal end of the stator support portion.

Thus, a fixation mechanism in which the stator is fixed to the stator support portion may be arranged on the inner side of the motor housing. Thus, it is possible to prevent the stator from being erroneously dismantled prior to the motor housing.

According to another embodiment, the machining device may have a stator fixation member that is mounted to the stator support portion to fix the stator to the stator support portion. The stator may be fixed to the stator support portion so as not to be rotatable around the motor axis by, for example, inserting a flat portion provided on the stator support portion to the inner peripheral side of the stator.

According to another embodiment, two bearings that rotatably support the motor shaft may be provided. One of the two bearings is situated on the output side, and the other is situated on the anti-output side. The bearing on the anti-output side may be retained by the stator support portion or the stator fixation member. As a result, the stator support portion or the stator fixation member functions as an output support portion.

According to another embodiment, the rotor base may be provided with a plurality of vanes, causing the rotor base to function as a cooling fan. This makes the electric motor to be compact in the motor axis direction.

According to an embodiment, the motor housing may be connected to a stationary cover to which the rotor is previously mounted so that the stator is arranged on the inner peripheral side of the rotor. Thus, when the motor housing is separated from the stationary cover, the stator is simultaneously separated from the rotor. As a result, the electric motor may be dismantled quickly and easily, that is, the stator and the rotor may be separated from each other quickly and easily.

According to another embodiment, the machining device may include a rotary cutting tool, an electric motor as a drive source for rotating the cutting tool, a motor housing accommodating the electric motor, and a stationary cover covering the cutting tool. The electric motor is an outer rotor type electric motor that includes a stator situated inside of a rotor. The stator may be fixed to the motor housing or the stationary cover so as to be immovable in the motor axis direction. The motor housing may be separated from the stationary cover while the stator and the rotor being mutually attracted to each other by a magnetic force.

In the case where the stator is fixed to the motor housing, the stator and the rotor may be removed from the stationary cover integrally with the motor housing while the stator and the rotor are mutually attracted to each other by the magnetic force. The stator may be separated easily from the rotor together with the motor housing against the magnetic force because the motor housing that is larger than the stator may be grasped to apply force for the separating.

In the case where the stator is fixed to the stationary cover, the stator and the rotor may be left on the stationary cover while the stator and the rotor are mutually attracted to each other by the magnetic force when the motor housing is separated from the stationary cover. The rotor may be separated easily from the stator together with the stationary cover against the magnetic force because the stationary cover that is larger than the rotor may be grasped to apply force for the separating.

Another embodiment may be an electric motor for a machining device according to one of the above embodiments. The electric motor is of an outer rotor type which includes a stator situated inside of a rotor. A rotor base supported by a motor shaft on the output side of the stator with respect to the motor axis direction may be provided, and the rotor may be mounted to the rotor base. The stator may be fixed to the inner side of the motor housing. Due to this construction, it is possible to improve the electric motor in terms of dismantling property and in terms of maintenance property.

DETAILED DESCRIPTION

Figure 1:
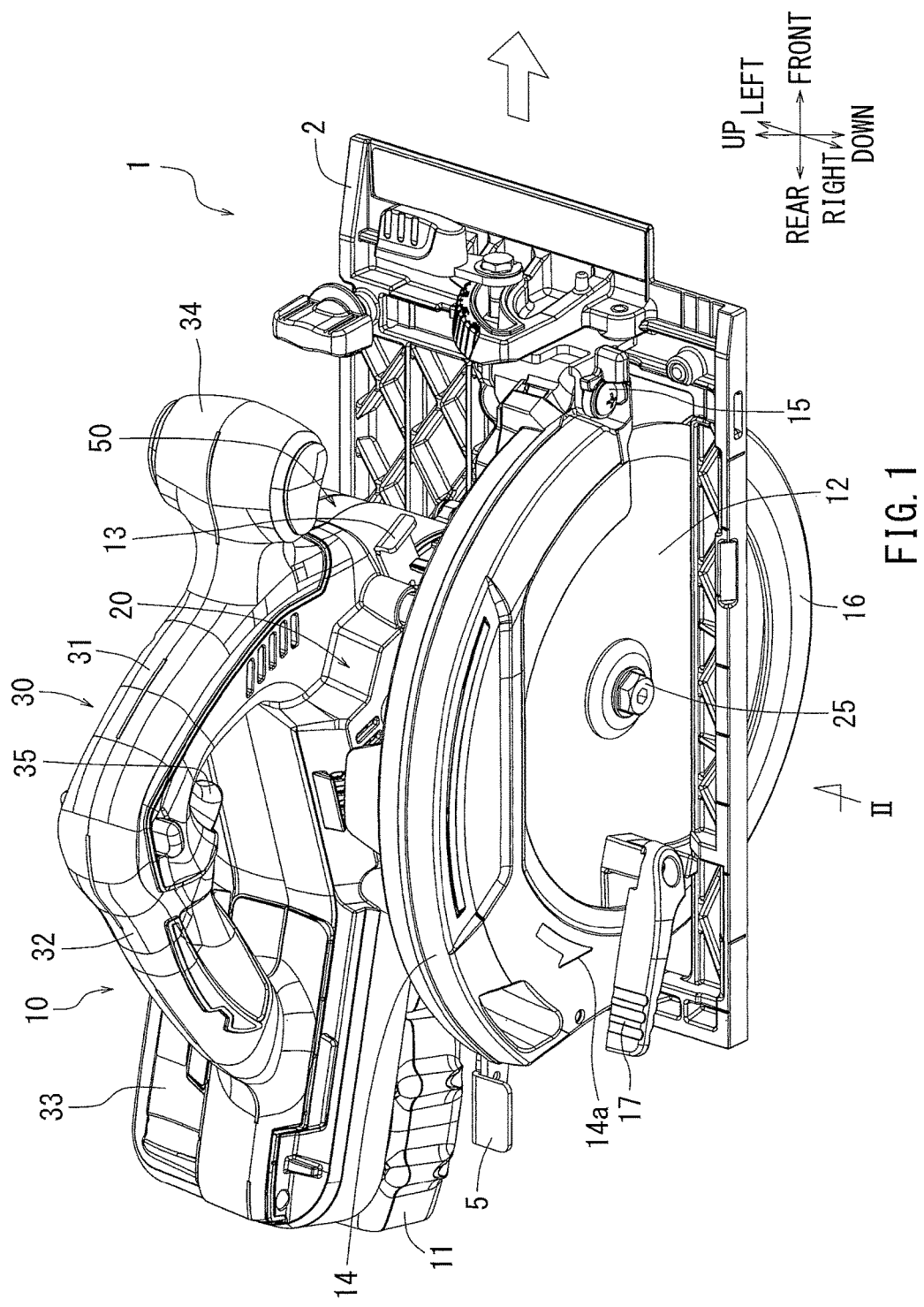
FIG. 1 is a perspective view of an overall of a machining device according to an embodiment of the present invention that has an electric motor as a power source.

The preferred embodiments of the present invention will be described below in detail with reference to the accompanying drawings. In the description, the same reference signs, without redundant description, will denote the same elements with the same functionality.

FIGS. 1 to 5 show a machining device 1 according to an embodiment. This machining device 1 is a portable circular saw, and includes a flat-plate-shaped base 2 brought into contact with an upper surface of work piece W, and a tool main body 10 supported by an upper portion of the base 2.

The tool main body 10 includes an electric motor 50 as a drive source, a reduction gear train 20 for decelerating rotational output of the electric motor 50, and a circular rotary cutting tool 12 mounted to a spindle 25 serving an output shaft of the reduction gear train 20. A lower portion of the rotary cutting tool 12 protrudes from a lower surface of the base 2, and this protruding portion is fed into the work piece W to perform cutting processing. The upper half of the rotary cutting tool 12 (the portion thereof upper than the base 2) is substantially covered with a stationary cover 14. The peripheral edge on the lower side of the rotary cutting tool 12 protruding below the lower surface of the base 2 is covered with a movable cover 16.

In each drawing, the direction of cutting proceeds is indicated by an open arrow. By moving the machining device 1 in the direction of the open arrow, the rotary cutting tool 12 is fed into the work piece W. In the following description, regarding the members and components, the direction in which the cutting proceeds (the direction indicated by the open arrow) will be referred to as the front side or the front portion, and the opposite direction will be referred to as the rear side or the rear portion. The user is positioned at the rear of the machining device 1, and moves the machining device 1. Thus, the right-left direction of the members and components is determined using the user as the reference. A motor shaft 54 serving the output shaft of the electric motor 50 extends in a direction crossing (orthogonal to) the direction in which the cutting proceeds (i.e., in the right-left direction).

Figure 3:
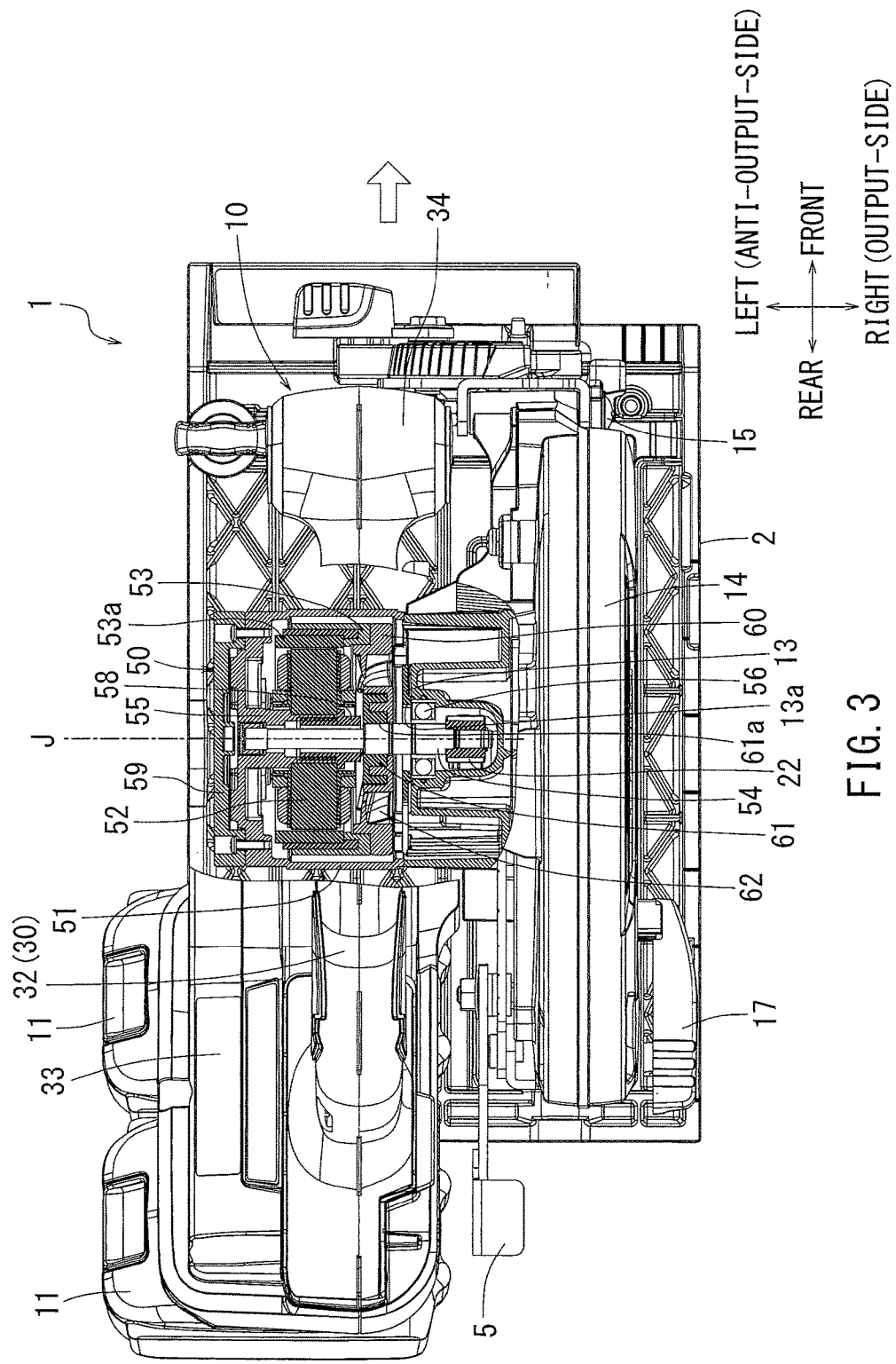
FIG. 3 is a plane view of the machining device as viewed from the direction shown by arrow (III) in FIG. 2, and a traverse section of the electric motor is illustrated therein.
Figure 4:
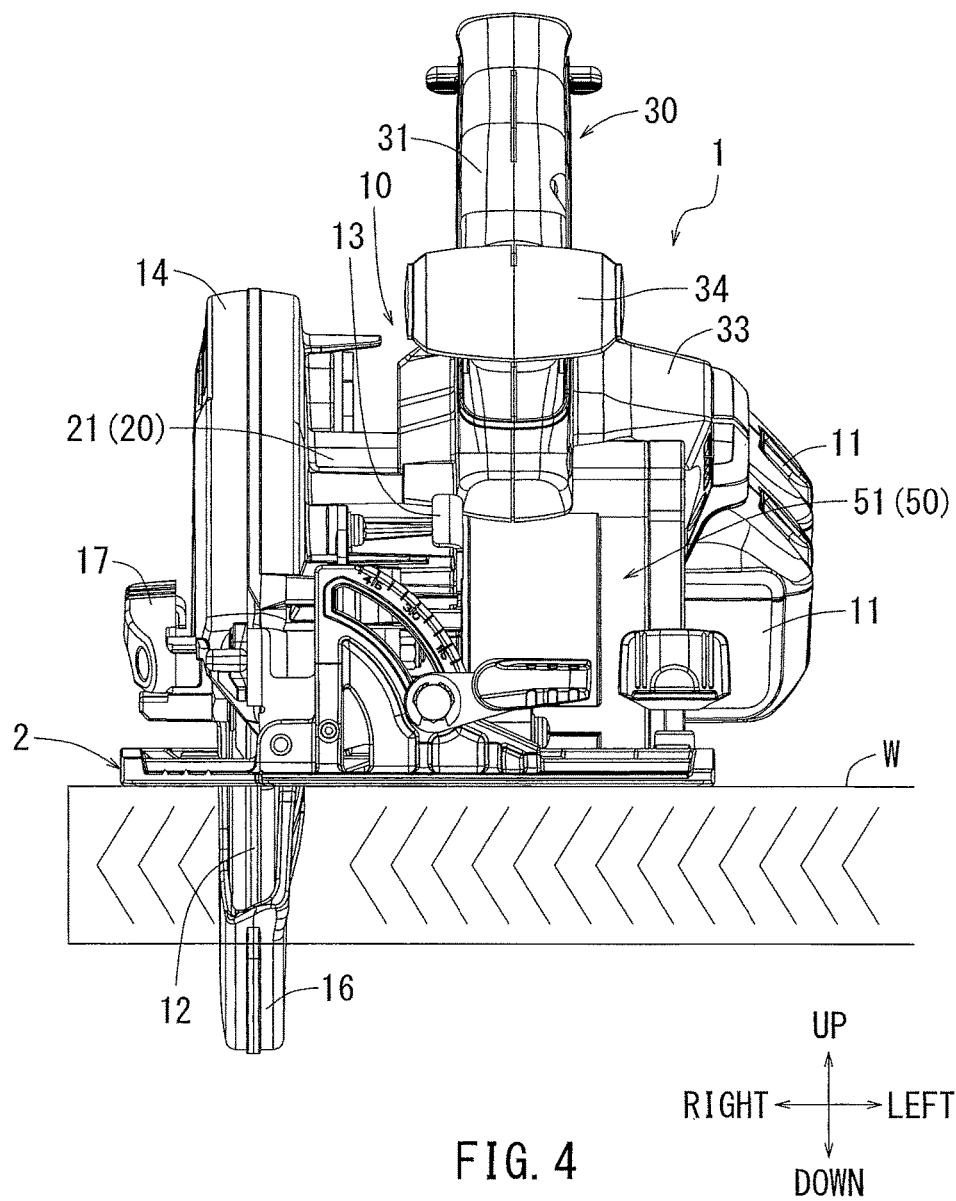
FIG. 4 is a front view of the machining device as viewed from the direction shown by an arrow (IV) in FIG. 2.

As shown in FIG. 4, a gear housing 21 accommodating the reduction gear train 20 is provided on a back surface (left hand side viewed from the user) of the stationary cover 14. A motor housing 51 of the electric motor 50 is connected to the gear housing 21. As shown in FIG. 3, the electric motor 50 may be a brushless motor and/or may be an outer rotor type motor.

Figure 5:
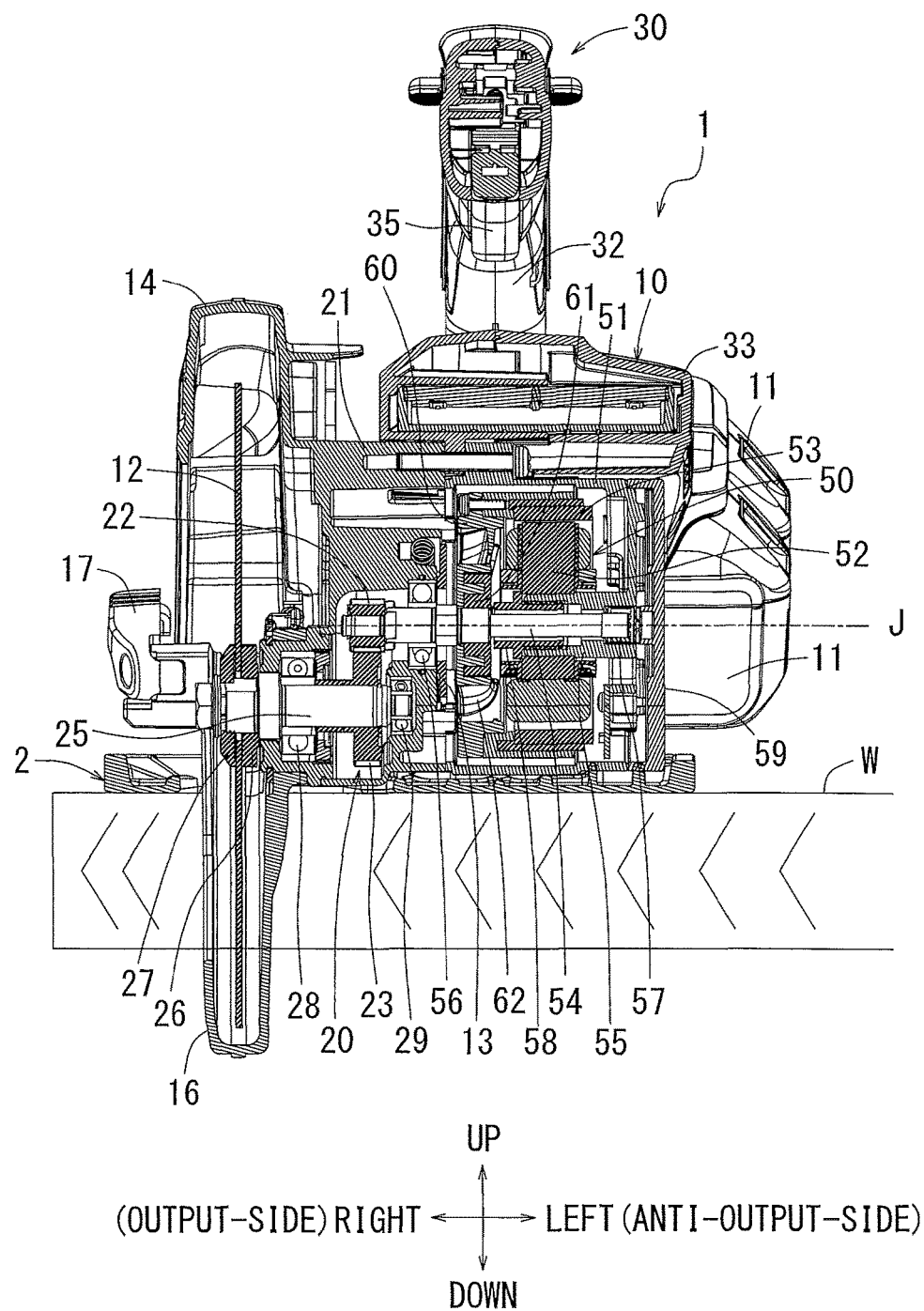
FIG. 5 is a vertical cross-sectional view of the machining device taken along line V-V in FIG. 2.

As shown in FIG. 5, a distal end of the motor shaft 54 of the electric motor 50 protrudes from the motor housing 51 and enters the reduction gear train 20. The reduction gear train 20 may constitute a single-reduction mechanism in which a driving gear 22 and a driven gear 23 are mesh-engaged with each other. The driving gear 22 is mounted to the motor shaft 54 of the electric motor 50. The driven gear 23 in mesh with the driving gear 22 is mounted to the spindle 25. The distal end of the spindle 25 protrudes into the stationary cover 14. The rotary cutting tool 12 is mounted to the protruding portion while held between a receiving flange 26 and a presser flange 27. The gear housing 21 supports the spindle 25 rotatably via bearings 28 and 29. The rotary cutting tool 12 rotates counterclockwise as seen from the right side. As shown in FIG. 1, the rotational direction of the rotary cutting tool 12 is indicated by an arrow 14*a* on the right side of the stationary cover 14.

The base 2 includes a swinging support shaft 15 that may support the tool main body 10 so as to be vertically swingable on a left side of the base 2. By changing the vertical swinging position of the tool main body 10 with respect to the base 2, the dimension in which the rotary cutting tool 12 protrudes below the lower surface of the base 2 can be adjusted. As a result, it is possible to adjust the in-feed depth of the rotary cutting tool 12 with respect to the work piece W. An operation lever 5 is provided at the rear portion of the tool main body 10. Operating the operation lever 5 in the loosening direction allows the tool main body 10 to be swung vertically with respect to the base 2. Thereby, in-feed depth of the rotary cutting tool 12 can be changed. The vertical swinging position of the tool main body 10 is fixed by swinging the operation lever 5 in the tightening direction. Thereby, the in-feed depth of the rotary cutting tool 12 is fixed.

Figure 2:
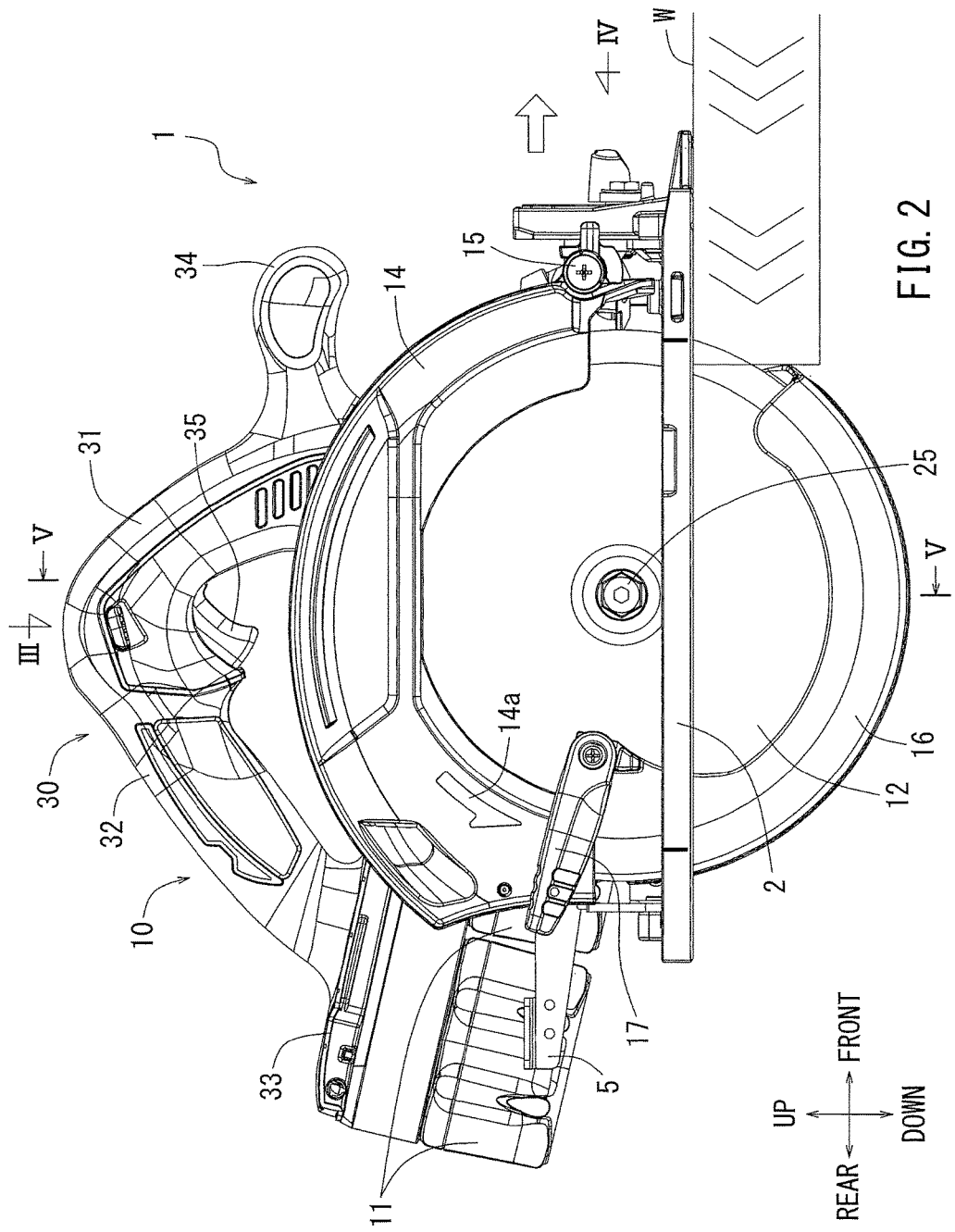
FIG. 2 is a side view of the machining device as viewed from the direction shown by an arrow (II) in FIG. 1.

The lower half of the rotary cutting tool 12 protruding below the lower surface of the base 2 is substantially covered with the movable cover 16. The stationary cover 14 supports the movable cover 16 so that the movable cover 16 is rotatable around the rotary cutting tool 12. As shown in FIG. 2, the movable cover 16 is biased in the closing direction (counterclockwise direction) by a spring. The distal end of the movable cover 16 may contact the end of the work piece W. In this contact state, the machining device 1 is moved in the cutting proceeding direction indicated by the open arrow in the drawing to feed the rotary cutting tool 12 into the work piece W. Thereby, the movable cover 16 is gradually opened against the elastic force of the spring that biases the movable cover 16. A handle 17 is mounted to the rear portion of the movable cover 16. The user grasps the handle 17, and can rotate the movable cover 16 against the spring force. This permits an operation such as a replacement of the rotary cutting tool 12.

As shown in FIG. 4, a handle portion 30 is provided near the connection portion between the electric motor 50 and the reduction gear train 20. As shown in FIG. 2, the handle portion 30 is of a chevron-looped-shaped configuration extending from the upper portion to the rear portion of the electric motor 50. The handle portion 30 has an erect portion 31 upwardly erect from the upper portion of the electric motor 50, a main grip portion 32 extending rearwards and downwards from the upper portion of the erect portion 31, and a battery mounting portion 33 that connects the rear portion of the main grip portion 32 to the rear portion of the electric motor 50. The main grip portion 32 is a portion to be held by one hand of the user, and a switch lever 35 is arranged on the lower surface of the main grip portion 32. A front grip portion 34 is provided on the upper portion of the erect portion 31 so as to protrude forwardly from the erect portion 31. The user may hold the front grip portion 34 by the other hand.

Two battery packs 11 can be mounted to the battery mounting portion 33 provided astride the rear portion of the main grip portion 32 and the electric motor 50. The battery packs 11 are caused to slide to the left (upwards in FIG. 3) to be detached from the battery mounting portion 33, and to the right (downwards in FIG. 3) to be mounted to the battery mounting portion 33. The detached battery packs 11 can be repeatedly used by being recharged by a separately prepared charger. By using the battery packs 11 as the power source, the electric motor 50 is driven.

As stated above, a so-called outer rotor type electric motor may be used as the electric motor 50. The electric motor 50 includes a stator 52 situated inside of a rotor 53.

Figure 6:
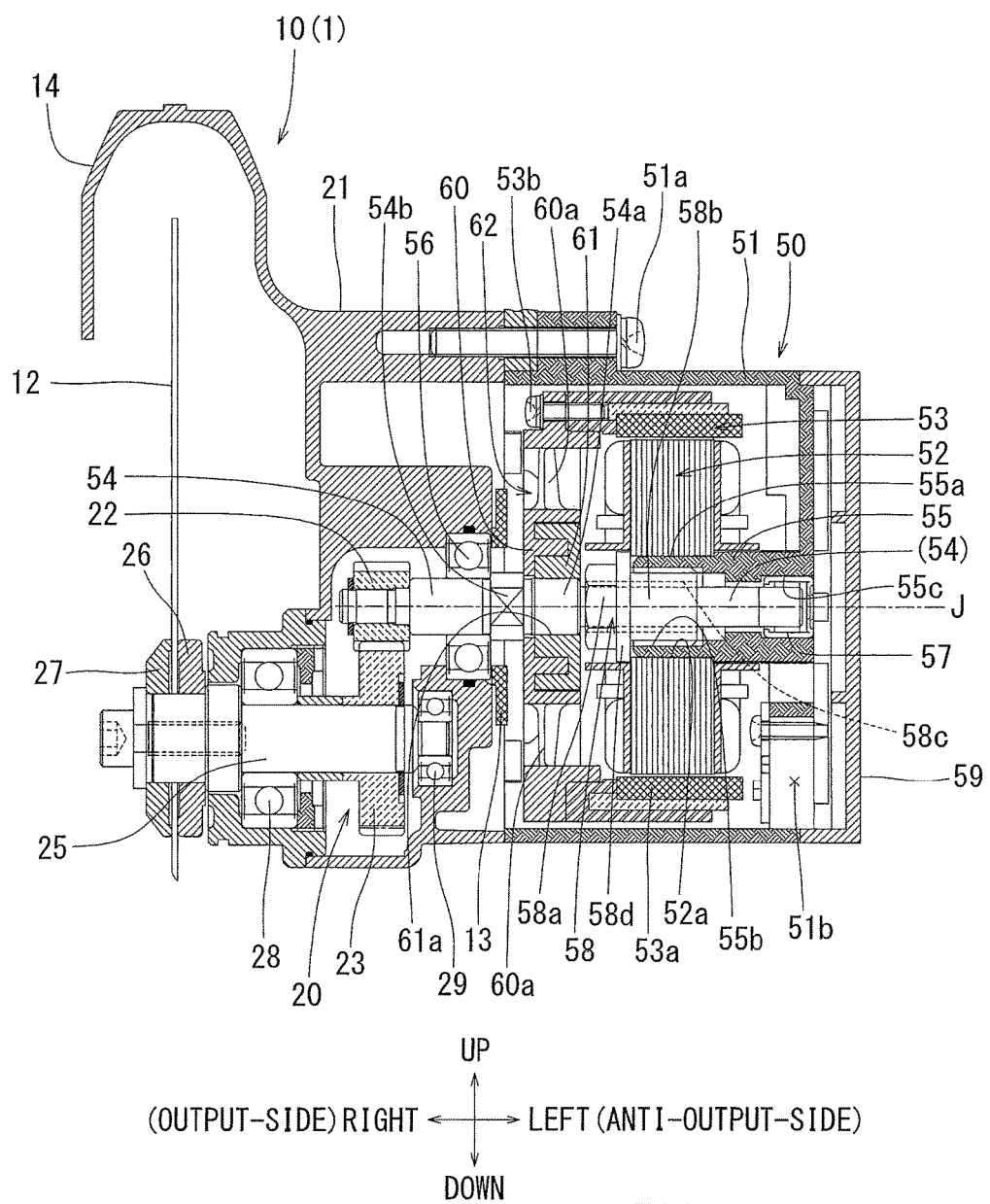
FIG. 6 is a vertical cross-sectional view including an electric motor according to a first embodiment.

FIG. 6 illustrates in detail the electric motor 50 according to a first embodiment. The stator 52 is fixed in position inside the motor housing 51. The rotor 53 is supported by the motor shaft 54. The motor shaft 54 is supported so as to be rotatable about the motor shaft J via bearings 56 and 57. The bearing 56 on the output side (left-hand side) with respect to the direction of the motor axis J is retained by the gear housing 21. The bearing 57 on the anti-output side (right-hand side) with respect to the direction of the motor axis J is retained near the anti-output side end portion of the motor housing 51. A ball bearing may be adopted as the bearing 56 on the output side with respect to the direction of the motor axis J. A needle bearing may be adopted as the bearing 57 on the anti-output side with respect to the direction of the motor axis J.

The motor housing 51 is a resin component produced through synthetic resin molding, and is connected to the anti-saw-blade side of the gear housing 21 by a plurality of fixation screws 51*a*. An air intake hole 51*b* or holes 51*b* are provided on the anti-saw-blade side end surface (anti-output side end surface) of the motor housing 51. A housing cover 59 is further mounted on the anti-saw-blade side end surface of the motor housing 51. The housing cover 59 prevents detachment of the bearing 57 from the motor housing 51. The housing cover 59 protects a lead wire leading to the stator 52.

A stator support portion 55 of a cylindrical configuration is provided on the anti-output side inner surface of the motor housing 51. The stator support portion 55 protrudes from the center of the anti-output side inner surface toward the output side with respect to the direction of the motor axis J, and is provided integrally with the motor housing 51. The center of the stator support portion 55 coincides with the motor axis J.

Flat portions 55a are provided on the distal end of the stator support portion 55. Each flat portion 55a is provided on the outer peripheral surface of the stator support portion 55 to make small width portion on the stator support portion 55. The small width portion is inserted into an oval-shaped central hole 52a. As a result, the stator 52 is integrated with the stator support portion 55 with respect to the rotational direction. The inner peripheral hole of the stator support portion 55 extends through in the direction of the motor axis J. A screw hole 55b is provided at the saw-blade-side portion of the inner peripheral hole. A retaining hole 55c is provided at the anti-output-side portion of the inner peripheral hole.

A stator fixation member 58 is mounted to the distal end of the stator support portion 55. The stator fixation member 58 has a hexagonal head portion 58a, a circular flange portion 58d, and a screw shaft portion 58b. The screw shaft portion 58b is screwed through the screw hole 55b of the stator support portion 55 to mount the stator fixation member 58 to the stator support portion 55. The screw shaft portion 58b can be firmly screwed in the stator support portion 55 by such as a socket engaged on the hexagonal head portion 58a. In this mounted state, the flange portion 58d of the stator fixation member 58 is held in contact with the right surface of the stator 52, and the stator 52 is fixed in position so as to be immovable in the direction of the motor axis J. The flat portions 55a of the stator support portion 55 are inserted into the oval central hole 52a, and the stator fixation member 58 is mounted. Thereby, the stator support portion 55 supports the stator 52 so that the stator 52 is incapable of rotating about the motor axis J and immovable in the direction of the motor axis J.

An insertion hole 58c is provided in the stator fixation member 58 and extends through the stator fixation member 58 along the motor axis J. The motor shaft 54 is inserted through the insertion hole 58c. The bearing 57 supporting the anti-output side of the motor shaft 54 is retained in a retention hole 55c of the stator support portion 55. An aluminum rotor base 60 is located at the output side of the stator 52 about the motor axis J. The aluminum rotor base 60 is mounted to the motor shaft 54 and may be mounted to the motor shaft 54 via a steel bush 61.

The steel bush 61 is of a lower thermal expansion coefficient than that of such as the aluminum rotor base 60. The steel bush 61 is mounted to the inner peripheral hole of the rotor base 60. The bush 61 is forced into the inner peripheral hole of the rotor base 60, and is firmly mounted to the rotor base 60. A forcing-in portion 54a of the motor shaft 54 is forced into the central hole 61a of the bush 61, and the rotor base 60 is fixed to the motor shaft 54 so as to be incapable of rotating around the axis and as to be immovable in the axial direction. The rotor base 60 is formed of aluminum to achieve lightweight thereof. While the steel bush 61 is forced in the motor shaft 54, the steel bush 61 is of a low thermal expansion coefficient to prevent thermal expansion. As a result, the thermal expansion of the central hole 61a is prevented, thereby the steel bush 61 is prevented from detaching form the motor shaft 54. The support rigidity of the rotor base 60 with respect to the motor shaft 54 is secured.

The rotor 53 is connected along the peripheral edge of the rotor base 60. The rotor 53 is of a cylindrical configuration, and protrudes toward the anti-output side with respect to the direction of the motor axis J. The rotor 53 is firmly mounted to the rotor base 60 by a plurality of screws 53b. A magnet 53a mounted on the inner peripheral surface of the rotor 53 is positioned around the stator 52 with a slight clearance.

A plurality of vanes 60a is formed on the rotor base 60. The vanes 60a configure a cooling fan 62 that is integrated with the rotor base 60. The cooling fan 62 rotates integrally with the motor shaft 54. The rotation of the cooling fan 62 introduces external air through the air intake hole 51b. The air intake hole 51b is provided on the anti-output side end portion of the motor housing 51. The air flows into the motor housing 51 through the air intake hole 51b and cools the electric motor 50 and passes between the vanes 60a.

The motor shaft 54 extends along the motor axis J. One portion of the motor shaft 54 extends in the motor housing 51 and the other portion protrudes from the motor housing 51 to the output side in the direction of the motor axis J. As stated above, the output side of the motor shaft 54 enters the gear housing 21. The driving gear 22 is connected to the output-side end of the motor shaft 54. The rotational output of the electric motor 50 is transmitted to the spindle 25 via the mesh-engagement between the driving gear 22 and the driven gear 23, whereby the output cutting tool 12 rotates.

As shown in FIGS. 3 and 4, a lock lever 13 for locking the rotation of the motor shaft 54 is provided on the output side of the electric motor 50. As illustrated in FIGS. 1 and 3, when the lock lever 13 is moved in the longitudinal direction thereof, an oval lock hole 13a provided in the lock lever 13 is engaged with the flat portion 54b provided on the motor shaft 54. As a result, the rotation of the motor shaft 54 is locked. Through the locking of the rotation of the motor shaft 54, the rotation of the spindle 25 is locked. This allows such an operation as the replacement of the rotary cutting tool 12.

As described above, the motor shaft 54 supports the rotor base 60 on the output side (gear housing 21 side) of the stator 52. The rotor base 60 supports the rotor 53. Regarding the position in the motor axis J direction, the rotor 53 is arranged on the output side via the rotor base 60, and the stator 52 is arranged on the anti-output side. In the step in which the electric motor 50 is mounted, the motor shaft 54 to which the rotor base 60 and the rotor 53 have been mounted is mounted to the stationary cover 14 side or reduction gear train 20 side. After this, the motor housing 51 is connected to the gear housing 21. At this stage, the stator 52 can be mounted to the inner peripheral side of the rotor 53. When dismantling the electric motor 50, the motor housing 51 is separated from the gear housing 21. At this time, it is possible to separate the stator 52 with respect to the rotor 53 while maintaining the rotor 53 in the state in which it is mounted to the reduction gear train 20 side together with the motor shaft 54. This facilitates the separation of the stator 52 from the rotor 53 against the magnetic force of the magnet 53a, because the rotor 53 is held at the gear housing 21. On the other hand, in the conventional configuration, the stator is separated from the rotor after the stator and the rotor are detached from the motor housing and the gear housing. Thus, it is possible to improve the dismantling property and, by extension, the maintenance property of the electric motor 50.

The stator 52 is fixed to the motor housing 51 by the stator fixation member 58. Thus, when separating the motor housing 51 from the gear housing 21 or stationary cover 14, the stator 52 is separated from the rotor 53 integrally with the motor housing 51. The stator 52 is separated from the rotor 53 against the magnetic force of the magnet 53a. The motor housing 51, however, is larger than the stator 52, so that the operator can apply a relatively large force to the stator 52 via the motor housing 51. Thus, the stator 52 can be easily separated from the rotor 53 against the magnetic force.

When separating the motor housing 51 from the gear housing 21 or stationary cover 14, the stator 52 is simultaneously separated from the rotor 53. This may facilitate and/or accelerate the dismantling operation.

When separating the motor housing 51 from the gear housing 21 or stationary cover 14, the stator 52 and the rotor 53 may be separated from the gear housing 21 or stationary cover 14 integrally with the motor housing 51 while mutually attracted by the magnetic force of the magnet 53a (magnetic-force attraction state). Even in this case, the stator 52 is fixed on the motor housing 51 that is larger than the stator 52. Thus, the stator 52 and the rotor 53 are easily separated because the operator can grasp the motor housing 51 to separate the stator 52 from the rotor 53.

There is known a conventional construction in which the stator is not fixed to the motor housing in the motor axis direction. In the conventional construction, the motor housing can be separated from the stationary cover while leaving the stator and the rotor on the stationary cover side. The stator and the rotor are removed from the stationary cover side while mutually attracted to each other as stand-alone units. In this case, it is very difficult to separate the rotor and the stator against the magnetic force that attracts to each other. The stator and the rotor are objects smaller than the motor housing and the stationary cover. Thus, a very large force is necessary to directly grasp the stator and the rotor in order to separate them from each other. As a result, the operation of separating the stator and the rotor from each other is very difficult to perform.

As described above, the stator 52 and the motor housing 51 can be treated integrally at the stage the stator 52 and the rotor 53 are separated from each other. Thus, the separating operation is facilitated and/or accelerated because the operator can grasp the motor housing 51 that is larger than the stator 52 in order to apply force for the separating operation. Thus, it is possible to enhance the workability (dismantling property) at the time of the dismantling of the electric motor 50 (the separation of the stator 52 and the rotor 53) and, by extension, to achieve an improvement in terms of maintenance property.

A plurality of vanes 60a is formed on the rotor base 60. As a result, the rotor base 60 may function as a cooling fan. Thus, as compared with the construction in which the cooling fan is separately supported on the motor shaft 54, the electric motor 50 may be more compact in the direction of the motor axis J.

In the embodiment shown in FIG. 6, the stator 52 is fixed to the motor housing 51. Alternatively, the stator may be fixed to the stationary cover 14 directly or indirectly so as to be immovable in the motor axis direction. In this construction also, the operator can grasp the stationary cover, which is larger and easily allows the application of force, and separate the stator and the rotor from each other quickly and easily. In this respect, this construction allows to attain an effect equivalent to that of the above construction.

Figure 7:
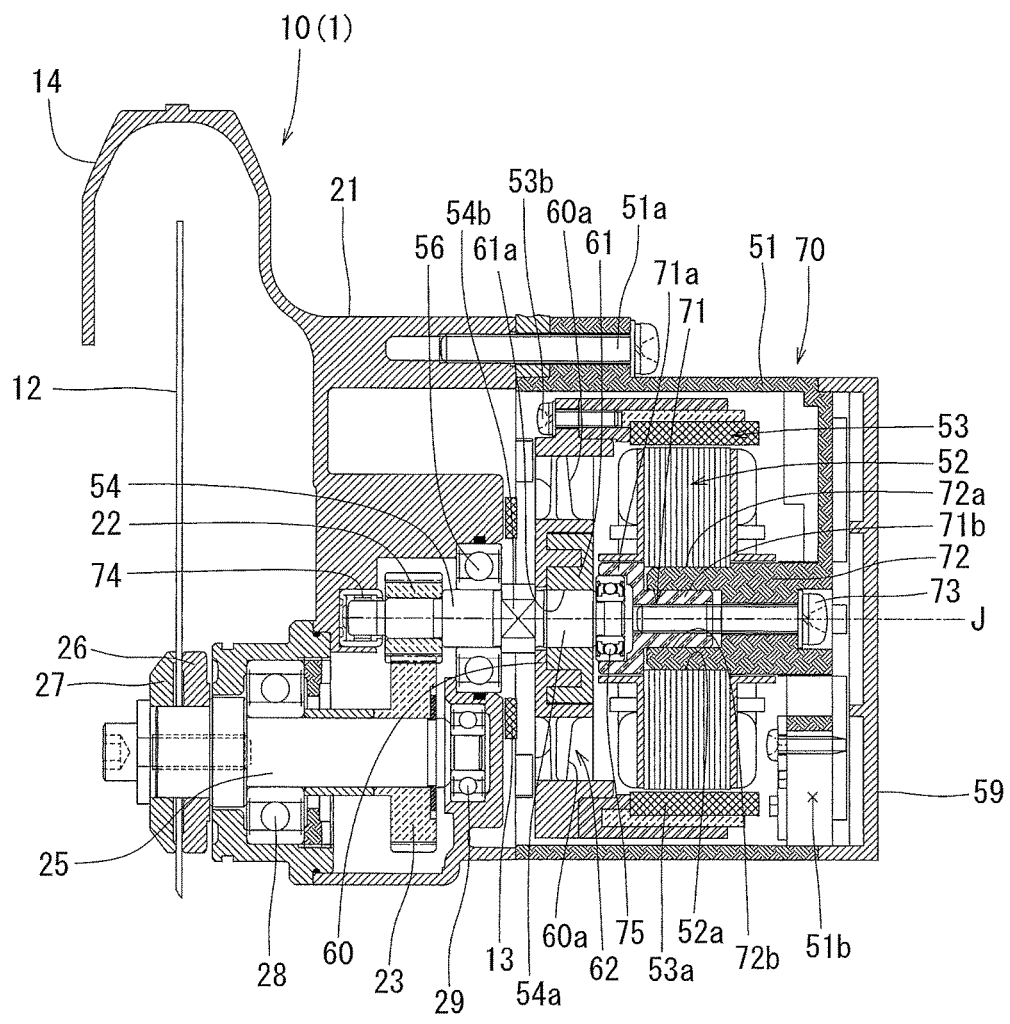
FIG. 7 is a vertical cross-sectional view including an electric motor according to a second embodiment.
Figure 7:
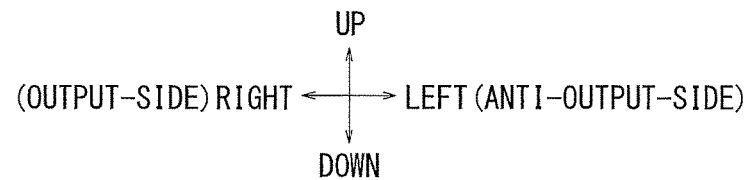

An embodiment shown in FIG. 7 includes an electric motor 70 instead of the electric motor 50 of FIG. 6. The same components as the embodiment of FIG. 6 are indicated by the same reference numerals, and a description thereof will be left out. The electric motor 70 of FIG. 7 has a stator fixation member 71 instead of the stator fixation member 58 of FIG. 6. The stator fixation member 71 regulates movement of the stator 52 in the direction of the motor axis J.

In the embodiment of FIG. 6, a flat portion 72a or flat portions 72a of a stator support portion 72 is inserted into the oval central hole 52a. As a result, the stator 52 is integrated with the stator support portion 72 so as to be incapable of rotating, and is supported by the stator support portion 72.

As shown in FIG. 7, the stator fixation member 71 has a bearing retaining portion 71a and a shaft portion 71b. The shaft portion 71b is forced into a hole 72b provided in the stator support portion 72, and the stator fixation member 71 is fixed to the stator support portion 72. A fixation screw 73 is screwed through the stator fixation member 71. The fixation screw 73 is screwed in along the motor axis J from the outer end of the anti-output side of the motor housing 51. A head of the fixation screw 73 contacts the outer end of the stator support portion 72 and pulls the stator fixation member 71 to the stator support portion 72. The fixation screw 73 may maintain the stator fixation member 71 on the inner end of the stator support portion 72. As a result, the stator fixation member 71 may more firmly mounted to the stator fixation member 71 to prevent rattling or looseness of the stator fixation member 71, by extension, of the stator 52 with respect to the stator support portion 72.

The bearing retaining portion 71a of the stator fixation member 71 retains a bearing 75. The bearing 75 supports the anti-output side of the motor shaft 54 and the bearing 56 retained in the gear housing 21 supports the output side of the motor shaft 54. The bearing 75 and/or bearing 56 may be a ball bearing. Further, a bearing 74 mounted in the gear housing 21 supports the output side end of the motor shaft 54. The bearing 74 may be a needle bearing. The bearing 56 and the bearing 74 are located on both sides of the driving gear 22 mounted on the motor shaft 54. Thus, the bearing 56 and the bearing 74 support the driving gear 22 stably.

In the embodiment of FIG. 6, the motor shaft 54 is passed through the inner peripheral side of the stator fixation member 58 and of the stator support portion 55. In contrast, in the embodiment of FIG. 7, the anti-output side portion of the motor shaft 54 only extends up to the portion retained by the bearing 75, and does not reach the stator support portion 72. The shaft portion 71b of the stator fixation member 71 and the fixation screw 73 are passed through the inner peripheral side of the stator support portion 72, and the motor shaft 54 is not passed therethrough.

Similar to the embodiment of FIG. 6, the motor shaft 54 of FIG. 7 supports the rotor base 60 on the output side of the stator 52 (gear housing 21 side). The rotor base 60 supports the rotor 53. When dismantling the electric motor 70, the fixation screw 51a is loosened to separate the motor housing 51 from the gear housing 21. At this time, the stator 52 may be separated from the rotor 53 while the rotor 53 is mounted to the reduction gear train 20 together with the motor shaft 54.

At the stage where the motor housing 51 has been separated from the gear housing 21 (stationary cover 14 side), even in the stage the rotor 53 and the stator 52 may be separated from the gear housing 21 while attracted to each other by the magnetic force of the magnet. Thus, the operator may easily separate the rotor 53 against the magnetic force of the magnet by grasping the motor housing 51 and applying a larger force afterwards.

Furthermore, in this process, the fixation screw 73 is not need to be loosed, and the stator fixation member 71 remains mounted to the stator support portion 72 in the forced-in state. The stator 52 is maintained and fixed to the stator support portion 72. In this state, the stator 52 may be separated from the rotor 53 against the magnetic force thereof by grasping the motor housing 51. Further, both of the stator 52 and the rotor 53 are fixed to the motor housing 51 or to the stationary cover 14. This configuration facilitates and/or accelerates the separating of the stator 52 from the rotor 53 as compared with the configuration in which at least one of the rotor and the stator is not fixed to the motor housing or to the stationary cover. In this respect, it is possible to achieve an improvement in terms of the dismantling property and, by extension, the maintenance property, of the electric motor 50.

Figure 8:
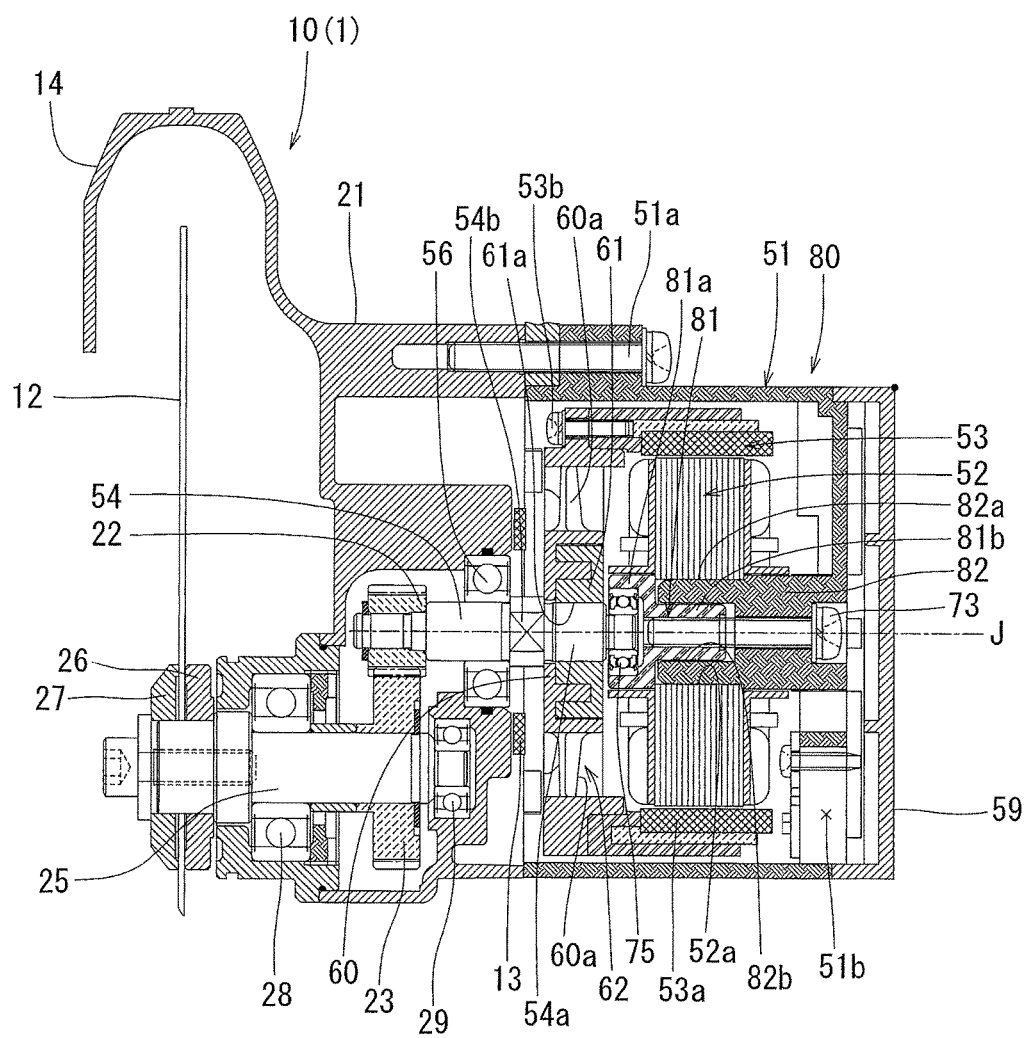
FIG. 8 is a vertical cross-sectional view including an electric motor according to a third embodiment.
Figure 8:
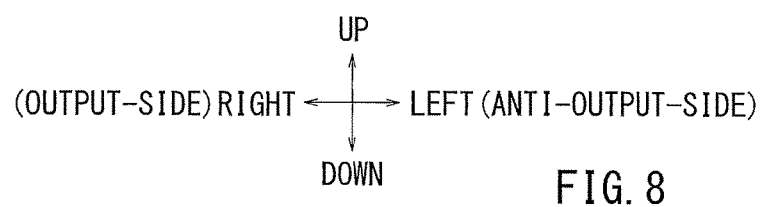

An embodiment shown in FIG. 8 has an electric motor 80 instead of the electric motor 70 of FIG. 7. The shaft portion 71b of the stator fixation member 71 in FIG. 7 is forced into the hole 72b of the stator support portion 72 to fix the stator fixation member 71 to the stator support portion 72. On the other hand, a stator fixation member 81 in FIG. 8 includes a support shaft portion 81 instead of the shaft portion 71b of FIG. 7. A stator support portion 82 is formed with an adjustment hole 82b instead of the hole 72b of FIG. 7. Similar to the bearing retaining portion 71a of FIG. 7, the stator fixation member 81 is provided with a bearing retaining portion 81a for supporting the anti-output side bearing 75 that supports the motor shaft 54. Similar to the embodiment of FIG. 7, the stator support portion 82 has a flat portion 82a or flat portions 82a like the flat portion 72a for integrating the stator 52 with respect to rotation. In the embodiment of FIG. 8, the bearing 74 shown in FIG. 7 that supports the output side end of the motor shaft 54 may be omitted. In this respect, the embodiment of FIG. 8 is the same as that of FIG. 6.

In the electric motor 80 of FIG. 8, the inner diameter of the adjustment hole 82b of the stator support portion 82 is set to be somewhat larger than the outer diameter of the support shaft portion 81b of the stator fixation member 81. As a result, an appropriate clearance is generated between the support shaft portion 81b and the adjustment hole 82b. Due to this clearance, the stator fixation member 81 can be adjusted in position in the radial direction (the direction orthogonal to the motor axis) with respect to the stator support portion 82. Thus, it is possible to adjust the rear (left) end position of the motor shaft 54 in the radial direction by loosening the fixation screw 73 and adjusting the stator fixation member 81 in position in the radial direction. As a result, it is possible to prevent contact between the stator 52 and the rotor 53 (so-called core rubbing).

Similar to the embodiments of FIGS. 6 and 7, in the electric motor 80 of FIG. 8, the rotor base 60 is situated on the output side of the stator 52 in the direction of the motor axis J, and the rotor 53 is mounted to the rotor base 60. The stator 52 is fixed to a stator support portion 82 provided on the anti-output side surface of the motor housing 51. To dismantle the electric motor 80, the fixation screw 51a is loosened to separate the motor housing 51 from the gear housing 21. Next, the stator 52 fixed to the motor housing 51 is separated from the rotor 53 against the attraction force of the magnet 53a. In this process, there is no need to loosen the fixation screw 73, thereby the stator fixation member 81 is remained to be fixed to the stator support portion 82. When separating the motor housing 51 from the gear housing 21, the anti-output side end of the motor shaft 54 is detached from the bearing 75.

In this way, also in the electric motor 80 of FIG. 8, when the motor housing 51 is separated from the gear housing 21, the stator 52 is simultaneously separated from the rotor 53. As a result, it is possible to improve the dismantling property of the electric motor 80 and, by extension, the maintenance property thereof. The rotor 53 may be separated from the gear housing 21 or stationary cover 14 together with the stator 52 by the magnetic force of the magnet, when the motor housing 51 is separated from the gear housing 21.

Even in this situation, the operator can apply afterwards the force for separating the stator 52 and the rotor 53 from each other by grasping the motor housing 51 that is larger than the stator 52. Thus, the stator 52 may be separated from the rotor 53 more easily as compared with the case where the stator 52 is directly grasped to apply force.

In the electric motors 50, 70, and 80 of FIGS. 6 to 8, the steel bush 61 of relatively small thermal expansion coefficient is forced into the center of the rotor base 60 formed of aluminum for integration. The forcing-in portion 54a of the motor shaft 54 is forced into the central hole 61a of the bush 61, thereby enhancing the rotor base 60 in support rigidity with respect to the motor shaft 54. In the electric motors 50, 70, and 80 of FIGS. 6 to 8, the bush 61 may be omitted while the rotor base as a whole may be formed of steel.

In the embodiments of FIGS. 6 to 8, the rotor base 60 is provided with a plurality of vanes 60a, and the rotor base 60 may function as a cooling fan. Alternatively or in addition to, a cooling fan may be arranged on the motor shaft 54 separately from the rotor base 60.

In the embodiment of FIG. 7, the bearing 74 supports the output side end of the motor shaft 54, and the driving gear 22 is supported at both ends by the bearing 74 and the bearing 56. Alternatively, the bearing 74 may be omitted while the driving gear 22 is supported in a cantilever manner as similar to the embodiments of FIGS. 6 and 8.

The motor housing 51 may be formed of resin or aluminum. The motor housing 51 formed of aluminum may enhance the dimensional accuracy of each portion of the motor housing 51.

As described above, the motor housing 51 formed of aluminum may be provided with the stator support portion 55, 72 or 82 integrally at the anti-output side end surface of the motor housing 51. As described above, the stator support portion 55, 72 or 82 formed of aluminum may be provided with the flat portion or flat portions 55a, 72a or 82a. The stator support portion 55, 72 or 82 may be provided with a shaft portion instead of the flat portion or flat portions 55a, 72a or 82a. The shaft portion may be forced into a circular central hole of the stator 52 to fix the stator 52 to the stator support portion 55, 72 or 82. In this construction, the stator 52 directly contacts the stator support portion formed of aluminum. Thus, the heat generated at the stator may transfer to the stator support portion and the motor housing. This enhances the heat radiation property of the electric motor.

As described above, the machining device 1 may be a so-called portable circular saw. Alternatively, the machining device may also be a so-called miter saw or desktop circular saw in which the cutting tool is fed into the work peace placed on a table by moving the machining device main body with relative to the table. The machining device may also be one of various types of other machining devices, such as a tipped circular saw, a diamond wheel, or a cutter configured to perform processing such as grooving by rotating a cutting tool such as a grindstone. And, the above-described outer rotor type electric motor is similarly applicable to such machining devices.

The various examples described above in detail with reference to the attached drawings are intended to be representative of the invention and thus not limiting. The detailed description is intended to teach a person of skill in the art to make, use and/or practice various aspects of the present teachings and thus is not intended to limit the scope of the invention. Furthermore, each of the additional features and teachings disclosed above may be applied and/or used separately or with other features and teachings to provide improved fuel vapor processing apparatuses, and/or methods of making and using the same.

What is claimed is:

1. A machining device comprising:
    a rotary cutting tool;
    an electric motor for rotating the rotary cutting tool;
    a motor housing configured to accommodate the electric motor; and
    a stationary cover configured to cover the rotary cutting tool, wherein:
        the electric motor is an outer rotor type electric motor that includes a cylindrical rotor and a stator situated inside of the rotor, with the stator having a central hole,
        the motor housing includes a stator support portion inserted into the central hole of the stator so that the stator is mounted to the stator support portion,
        a motor shaft is rotatably supported by the stationary cover via a bearing,
        the motor shaft is connected to the rotary cutting tool via a gear or gears and the motor shaft includes an end projecting from the stationary cover toward the motor housing,
        a rotor base is mounted at the end of the motor shaft,
        the rotor is attached to the outer peripheral edge of the rotor base, the rotor extending from the rotor base in a direction away from the stationary cover,
        the stationary cover is mounted to the motor housing so that the rotor is arranged outside of the stator with a clearance, and
        when the stationary cover is removed from the motor housing, the rotor is removed together with the stationary cover from the stator attached to the motor housing.

2. The machining device of claim 1 wherein the rotor base is provided with a plurality of vanes, causing the rotor base to function as a cooling fan.

3. The machining device of claim 1, wherein
    the rotor includes a magnet, and
    the motor housing is configured to be capable of being separated from the stationary cover while the stator and the rotor are mutually attracted to each other by a magnetic force of the magnet.

* * * * *